July 15, 1969 — H. ALBERTS — 3,454,984
INJECTION MOLDING APPARATUS FOR MANUFACTURING ZIPPERS
Filed Sept. 26, 1966 — 2 Sheets-Sheet 1

INVENTOR
Herbert Alberts
BY Otto John Munz
ATTORNEY

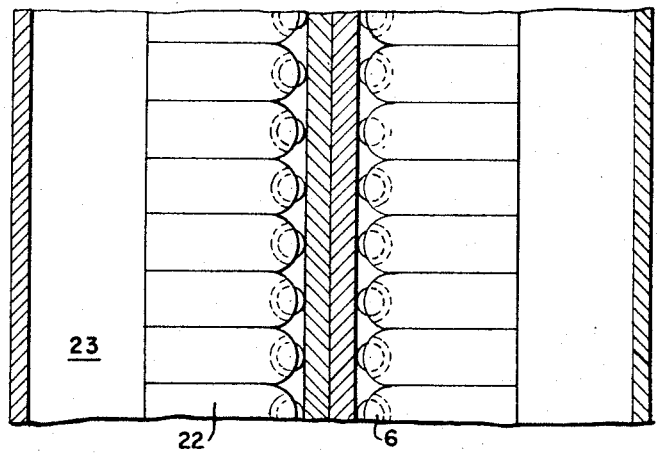
FIG.6
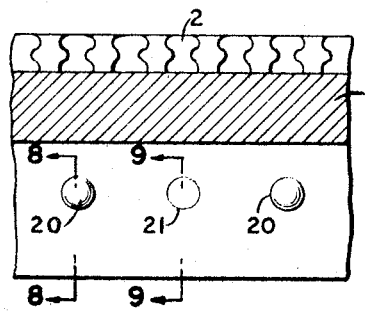
FIG.7
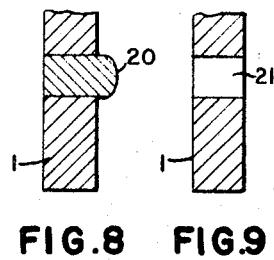
FIG.8 FIG.9
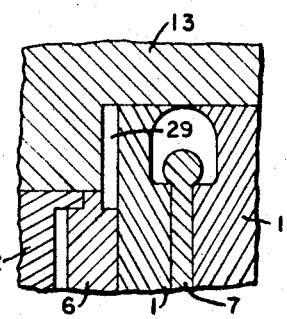
FIG.10
FIG.11
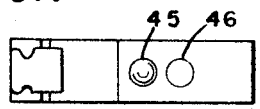
FIG. 12.
FIG.13
FIG.15
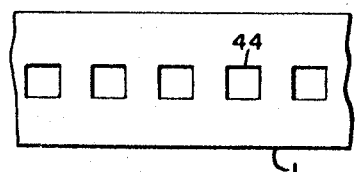
FIG.14
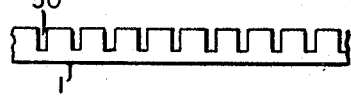
FIG.17
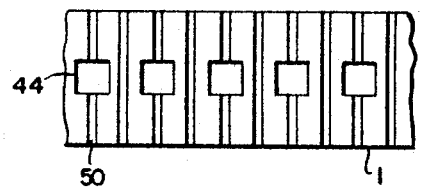
FIG.16
INVENTOR
Herbert Alberts
BY *[signature]*
ATTORNEY United States Patent Office 3,454,984
Patented July 15, 1969

3,454,984
INJECTION MOLDING APPARATUS FOR
MANUFACTURING ZIPPERS
Herbert Alberts, Rua Capitao Luiz Ramos 312,
Sao Paulo, Brazil
Continuation-in-part of application Ser. No. 474,566,
July 26, 1965. This application Sept. 26, 1966, Ser.
No. 582,084
Claims priority, application Brazil, July 27, 1964,
7,129/64
Int. Cl. B29c 3/02
U.S. Cl. 18—4                                8 Claims

ABSTRACT OF THE DISCLOSURE

Small inlays having halves of molds are arranged on two steel bands. The bands move into mutually facing position where the inlays mate to form complete molds. While the inlays are in mating position, molten material is fed into their molds. When the bands move apart, holders bear against the inlays to prevent their falling from the bands.

---

This is a continuation-in-part application to copending parent application Ser. No. 474,566, now Patent No. 3,355,771, and the priority dates to which the parent application is entitled are claimed for all subject matter common therewith. This parent application has matured into U.S. Patent No. 3,355,771, issued Dec. 5, 1967.

This invention relates to an apparatus for producing zippers. In particular, this invention relates to an improved apparatus for manufacturing zippers by injection molding techniques.

In summary, the molding apparatus of this invention is a device for making zippers comprising an injection means defining an injection chamber and a cooling chamber, a portion of two steel band means passing through said chambers, said portion of the two steel band means being in mutual contact, each band means being supported upon at least to support rollers, said support rollers, having axes parallel to each other and to the faces of the steel band means, the contacting faces of the steel band means, the contacting faces of the steel band means having fastener element mold halves at first edges of said steel bands and forming a textile tape support recess in communication with said fastener element molding recesses.

Previously known devices for the manufacture of zippers by molding the fastener elements of a zipper in an injection molding process provided for the simultaneous injection molding of only a limited section of the aforementioned fastener elements onto a textile fabric carrier tape. This is a deficiency resulting partly from the piston injection molding process wherein the piston must move forward and back, thus causing an interruption of the feed of molten material into the mold. It causes a disadvantageous batch operation requiring opening and closing the mold to remove the molded section after it is cooled and, respectively, to permit the advance of a finished stringer section from the mold and the admission of a new section of tape. In previously known conventional injection molding processes, the length of each section of fastener elements is limited because of the limited ability of the injected material to flow, by means of the supply channels, to the individual mold parts. Uniform flow requires a uniform temperature and viscosity. These are difficult to maintain because the zipper consists of individual fastener members, independent of one another, each of which is formed by a minute mold connected to a main supply channel by means of capillary channels. Accordingly, the above-mentioned sections must be relatively short.

In the conventional injection molding process, for zippers, because of the limitations described hereinabove, a rather complicated machine is required to mass produce the zippers in a profitable manner.

When zinc zippers are injection molded in a conventional machine, from 100 to 200 sections can be cast per minute because of the high heat conductivity and rapid cooling rate of the zinc alloy. When thermoplastic resins such as polyamides or polyacetals are cast, this advantage is not present since these materials are poor heat conductors. Since the cooling is slower, the machine must operate more slowly, increasing the cost of the product.

It is an object of this invention to provide an apparatus for molding zippers at a high continuous rate.

It is another object to provide an apparatus which can produce zippers in sections having any length desired, using a continuous injection molding process. It it also an object of this invention to provide a simple, inexpensive apparatus which provides the above objects.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 6 is a view of the section of line 6—6 of FIG. 3;

FIG. 7 is a view of the section of line 7—7 of FIG. 4;

FIG. 8 is a view of the section of line 8—8 of FIG. 7;

FIG. 9 is a view of the section of line 9—9 of FIG. 7;

FIG. 10 is a view of the section 10—10 of FIG. 1;

FIG. 11 is a top view of an inlay of the invention;

FIG. 12 is a front view of an inlay of the invention;

FIG. 13 is a view of the section of line 13—13 of FIG. 15;

FIG. 14 is a front view of a band of the invention;

FIG. 15 is a top view showing the inlays of the invention in closing contact between two bands;

FIG. 16 is a front view of a band of the invention;

FIG. 17 is a side view of FIG. 16.

Figure 1:
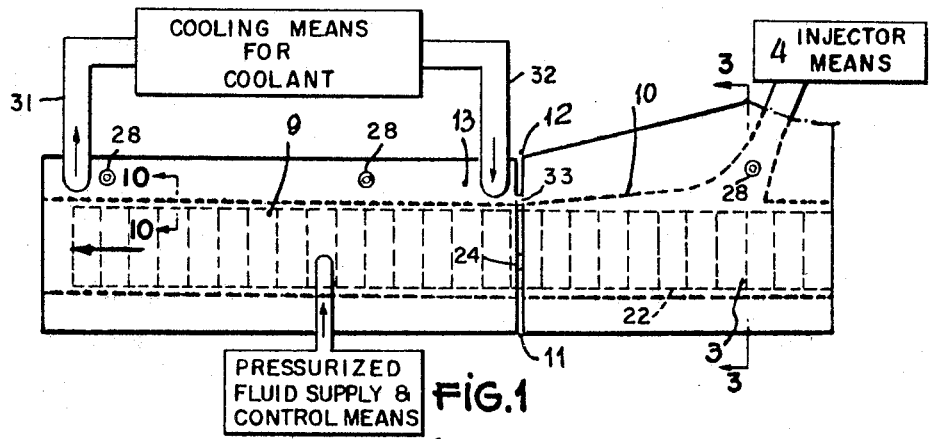
FIG. 1 is a side view of the combination of injection chamber, cooling chamber and guide of the moldcarrying steel bands or open-link chains.
Figure 2:
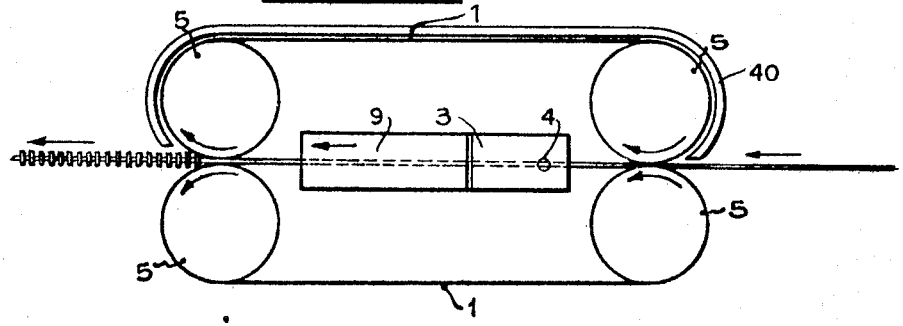
FIG. 2 is a top view of the two moldcarrying steel bands or open-link chains, the injection chamber, and the cooling chamber.

In accordance with the present invention as shown in FIG. 2, two endless hardened steel band means such as bands 1, provided with recessed mold halves 2, or open-link chains carrying mold halves, are passed through an injection chamber 3 which is filled with pressurized, injectable, thermoplastic, liquid material. As shown in FIG. 1, this chamber is connected, for example, to the orifice of an injector means 4 which supplies the molten fluid material to the injection chamber at a uniform rate and a constant pressure.

The endless steel bands or open-link chains 1 are each mounted on two drive rollers or disks 5 in a manner similar to that in a band saw. When the bands come together at the right side of FIG. 2, they enclose a fed tape. The tape is shown emerging at the left of FIG. 2, with molded fastener elements on it.

Figures 3, 4, 5:
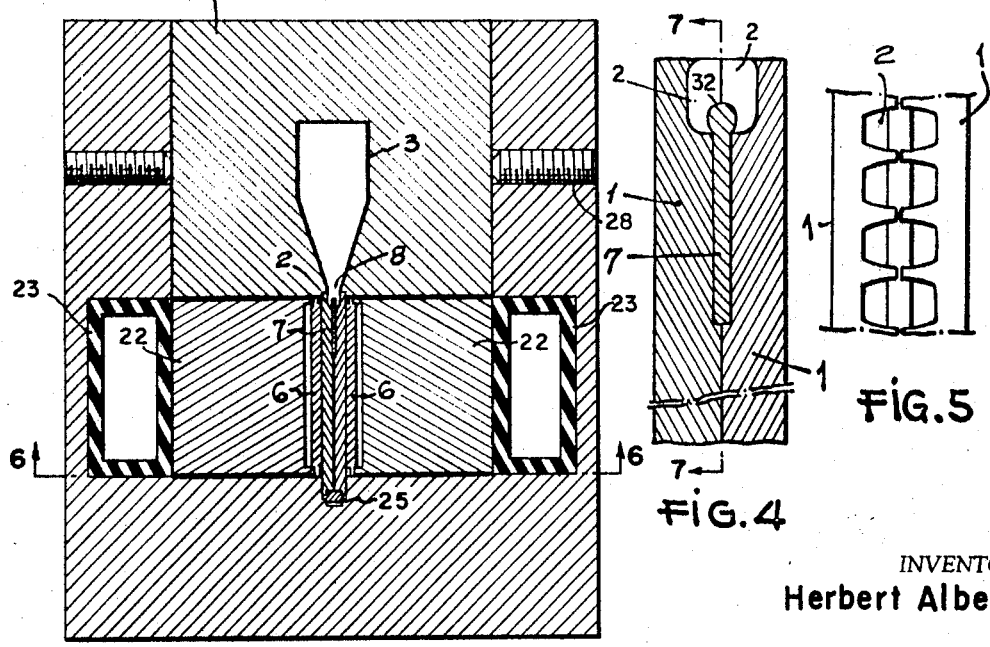
FIG. 3 is a cross-sectional view of the injection chamber and of the endless steel bands or open-link chains taken along line III—III of FIG. 1.
FIG. 4 is an enlarged view of a portion of FIG. 3.
FIG. 5 is a top view of FIG. 4.

As shown in FIG. 4, the recessed mold halves 2 are defined by one of the surfaces of each band 1 and extend to the rim thereof, said rim being named the first edge. The faces of two steel bands 1 or open-link chains which are provided with recessed mold halves 2 come into abutment at the right of FIG. 2. As shown in FIGS. 7–9, each band 1 has pins 20 and holes 21 accurately placed relative to the mold halves 2. These pins and holes mate with opposing holes and pins when the bands come into abutment and assure that the mold halves are accurately aligned when in the injection chamber and in the cooling chamber 9. The then parallelly disposed steel bands 1 or open-link chains are pressed together when they pass through the injection chamber 3 by the walls thereof. The walls are segmented and pneumatically or hydraulically adjustable and are provided with pin bearings 6 and 25 for reducing the friction between the walls and the steel bands.

FIG. 1 shows the segments 22. FIG. 3 shows a cross section including two of the segments in opposing position. Fluid chambers 23 carry pressurized fluid from a pressurized fluid supply and control means. These chambers expand and force the segments toward the centrally positioned bands. FIG. 6 shows that the force is actually transmitted to the bands by pin bearings 6 mounted in the ends of the segments. The fluid pressure can be transmitted between the injection unit and the cooling unit by a connection 24 or it can be introduced separately into each. It is within the scope of the invention to make the pin bearings 25 at the bottom surfaces, the second edges, of the bands also adjustable in the same manner used for the bearings 6.

The mold-carrying edge surfaces of the steel bands or open-link chains are enclosed by an adjustable upper wall 13 of the injection chamber 3 which prevents exit of still molten, injected material. The upper wall 13 of the cooling chamber 9 has the same function and is also adjustable. Any amount of thermoplastic material which might overflow in the form of a film at the upper edge surface of the mold structure will be removed with a knife or a milling operation after the molded articles leave the cooling chamber 9. Adjustment of the upper walls is accomplished by loosening screws 28 and moving the walls.

The mold recesses 2 extend to the first edges of the steel bands or open-link chains 1 and open at the first edge therethrough. The edge openings of the molds 2 constitute the inlet for the liquid material which flows into and fills mold 2.

In contrast to prior art zipper injection mold devices, the feed inlets to the molds 2 of the apparatus of this invention can be made as large as is necessary to insure adequate flow of plastic or other fluid materials. In the prior art devices, the injected material remaining in the feed inlets after the cooling step was undesirable flashing or scrap on the finished zipper. Separate removal steps were necessary to eliminate the scrap. In order to prevent damage of the molded zipper parts during the scrap removal, it was necessary to minimize the thickness of the scrap or flashing and hence the minimize the size of the feed inlets. Otherwise, the construction or configuration of the finished articles were injured in the flashing removal operation.

This problem is not present in the device of the present invention. In the device of the present invention, there are no projecting feedhead connections when the mold-carrying endless steel bands or open-link chains 1 leave the injection chamber 3, because the upper wall 10 slopes in the direction of travel of the mold-carrying bands and approaches a position closely adjacent to the mold inlets at the end of the injection chamber. In the cooling chamber 9, the upper wall extends in the same plane closely adjacent the mold inlets. In this case of the present invention, only a thin connecting film adheres to each fastener element at the inlet of its mold. It is apparent that the larger feed inlets permit a more rapid feed influx into the molds 2 as well as the direct injection of feed into the injection chamber 3. In accordance with the present invention, the injected material is processed under absolutely uniform conditions with respect to temperature, pressure and viscosity.

The injection chamber constitutes a hollow chamber in the form of a channel 8 which extends upward from above the upper edges of the mold-provided bands 1 or open-link chains and parallel thereto. This channel 8 is constantly filled with injected material, for instance fluid plastic, maintained under pressure and supplies the molds 2, filling the molds as they travel through the injection chamber 3. The molds are filled when they reach the end of the chamber where the upper wall 10 reaches the upper, first edges of the bands.

As shown in FIG. 10, a cooling system is provided for the cooling chamber 9. This system comprises a coolant, a cooling means for the coolant and channels to circulate the coolant around the molds of the band passing through the cooling chamber. The coolant passes into the cooling chamber through pipe 31, runs in ducts 29 along the outer sides of the moving bands and leaves the chamber via pipe 32. Toward the left side in FIG. 1, the upper wall 13 can be adjusted upwards to leave a gap between the wall and the tops of the filled molds, so that coolant can act on the tops of the molds.

In another embodiment, the wall abuts on the sides of the bands in bearing engagement and acts as a heat sink. In this bearing engagement, there is no duct 29 present. Thus, FIG. 10 would differ in this embodiment, in that duct 29 would be absent and wall 13 would abut on the sides of the bands. However, a duct can be situated internally in the upper wall and coolant passed therethrough to improve the heat extracting ability of the heat sink. It is furthermore within the scope of the invention to shorten the pin bearings 6, so that more of the wall area of the cooling chamber abuts on the sides of the bands, and, in the limit, to completely remove the pin bearings.

It can be seen that lengthening the injection chamber 3 permits a quicker passage of the molds 2 therethrough, increasing the production rate of the machine. It can also be seen that the length of the cooling chamber 9 depends upon the length of the injection chamber 3.

The steel bands or open-link chains 1 which carry the molds 2 are additionally provided with a bed or recessed portion for receiving the tape 7 for the hook elements. This tape, made for instance of textile, must not prevent the complete closure of the molds. The bed recesses for the afore-mentioned textile band 7 extend downward from the mold halves 2 and communicate therewith so that the reinforced welt edge 32 of the band 7 projects between mold halves 2 in order to be rigidly connected with the hook element when the latter is injected thereinto and formed.

In accordance with the present invention, the mold-carrying steel bands 1 or open-link chains may have a length of, for example, 6 meters or more. Preheating means can be provided for heating the bands after they exit from the cooling chamber 9 in order to facilitate the rapid filling of the molds 2.

The inner ceiling 10 of the injection chamber 3 comprises an inclined surface in the longitudinal and traveling direction of the mold-carrying steel bands 1 or open-link chains. This gradient or incline is so provided that the inner ceiling 10 is positioned at the entry of the thermoplastic material of the injection chamber 3, at a distance from the edges of the steel bands 1 or open-link chains and gradually approaches to a position closely adjacent the head of the molds.

The cooling chamber 9 is formed as an extension of the injection chamber 3 except that the ceiling is positioned close to the molds and, covering the same, along the full length of the chamber.

The injection chamber 3 is equipped with thermo-couple elements and subdivided into several adjustable heating zones. For instance, it may be necessary, depending on the material being injected, to heat the inner ceiling of the injection chamber in the region near the cooling chamber to prevent solidification of material in the injection chamber and consequent jamming of the bands. In order to prevent a flow of heat from the injection chamber 3 into the cooling chamber 9, the two walls of the adjoining chambers are connected together by only a narrow bridge 33. The major portions of the chamber walls are separated by cross slits 11 and 12 which do not extend into the molds 2 or the ceiling thereabove. The slits comprise a transversely extending outer recess which terminates slightly above the molds so that the ceiling is provided, at that point, with a thin wall.

In this manner, the molds will not be affected by any interruption in the closure thereof, and the flow of heat from the injection chamber 3 to the cooling chamber 9 is greatly reduced.

In another embodiment of the invention shown in FIGS. 11 through 15, the molds 2 are not provided in the bands 1 themselves, but are rather in inlays 42 set into the bands. Each inlay has a projection 43 that sits into a fitting hole 44. The holes 44 are spaced on the band, so that when the inlays are in place, there is a continuous series of mold halves on the band. Each inlay has alignment means, such as stud 45 and receptacle 46. When the bands 1 move around the rollers 5 to bring the inlays into abutment, the stud and receptacle of an inlay on one band engages in the receptacle and stud of an oppositely situated inlay on the other, thereby bringing the mold halves accurately into closure.

The inlays are simply set into the holes 44 on the bands. Holder 40, shown in FIG. 2, bears slightly on the inlays to prevent their falling out of the band, when the inlays are not in abutment. Only one holder is drawn in FIG. 2, it being understood that there is a corresponding holder for the bottom half of the figure. As the bands move around the rollers 5, the curvature of the bands is not assumed by the inlays, so that the inlays stick out slightly from the band. The holders 40 must thus be separated slightly more from the bands when the bands move around the rollers. When each mold is provided in an inlay, the flexibility of the bands 1 is substantially reduced because the bands must be thick enough to provide a sufficiently deep inlay hole 44. Flexibility can be retained in these thicker bands, as shown in FIGS. 16 and 17, by placing channels 50 transversely through the bands on the sides whereon the inlays will sit. These channels can be sawed into the bands before they are hardened, or they can be ground in, in a grinding operation subsequent to hardening. When these channels are provided, the holes 44 are made smaller in their longitudinal dimension, so that the strength of the walls of these holes is not affected by the channels.

Obviously, many modifications and variations of the invention as hereinabove set forth can be made without departing from the essence and scope thereof, and only such limitations should be applied as are indicated in the appended claims.

I claim:

1. A molding apparatus comprising two steel band means, each band means being mountingly supported upon at least two support rollers, said support rollers having axes parallel to each other and to the faces of the band means, each band means having a plurality of halves of element mold means arranged in series thereon, said halves being inlays, said band means having holes for the reception of said inlays, a portion of said band means being in mutually facing position, the inlays on the facing portions of said band means being in mold closing contact.

2. The molding apparatus of claim 1 wherein the steel band means is an endless steel band.

3. An apparatus as claimed in claim 2, said band means having transverse channel means to insure their flexibility.

4. The molding apparatus of claim 1 wherein the steel band means is an endless open-link chain.

5. An apparatus as claimed in claim 1, further comprising means to hold said inlays in said holes when said halves are out of closing contact.

6. An apparatus as claimed in claim 1, further comprising means to accurately align the halves of said mold means when they are in closing contact.

7. The molding apparatus of claim 1 wherein said element mold means in closed contact have element cavities open at first edges of said steel band means for receipt of molten material and wherein said mold means have band support recess means communicating with said cavities.

8. The molding apparatus of claim 7 wherein the steel band means are disposed between a plurality of pin bearings having axes parallel to the mutually facing portions of said steel band means and further comprising means to keep said pin bearings in contact with the bands, whereby the mold means are maintained in closed engagement, and wherein second edges of the steel band means are supported by roller pins having axes perpendicular to the contacting faces of the steel band means.

References Cited

UNITED STATES PATENTS

| | | | |
|---|---|---|---|
| 1,612,737 | 12/1926 | Lane | 164—278 |
| 2,282,308 | 5/1942 | Dahlin | 18—302 X |
| 2,817,875 | 12/1957 | Harris et al. | 18—4 |
| 3,066,351 | 12/1962 | Schriner | 18—4 X |
| 3,193,888 | 7/1965 | Rochester | 164—278 |
| 3,323,167 | 6/1967 | Verges et al. | 18—4 X |
| 3,355,771 | 12/1967 | Alberts | 18—30 |

WILBUR L. McBAY, Primary Examiner

U.S. Cl. X.R.

18—30; 164—278